Nov. 18, 1924.
A. N. PASMAN
1,515,750
BUSHING LINER
Filed Oct. 27, 1922
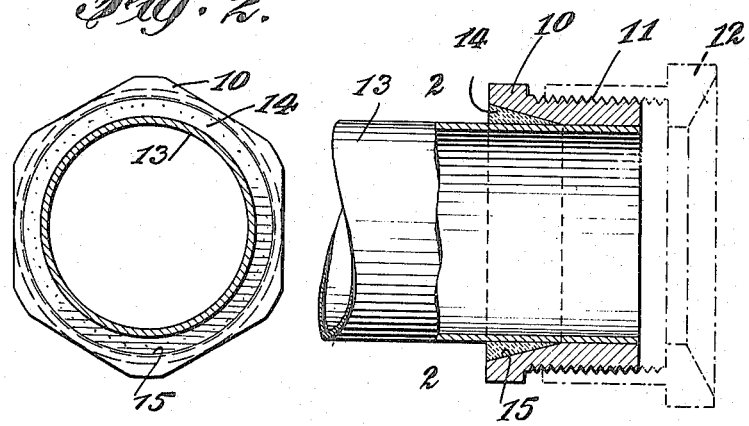
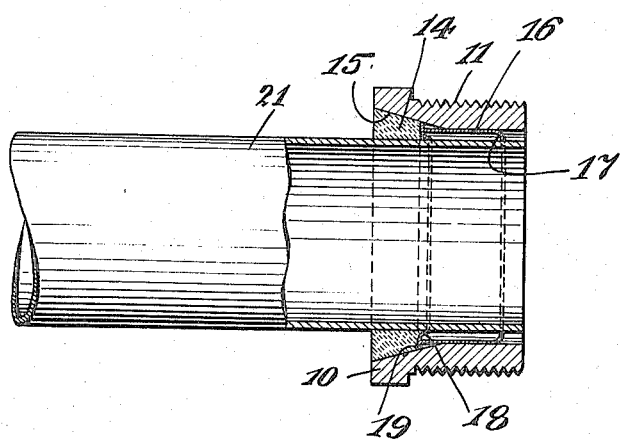
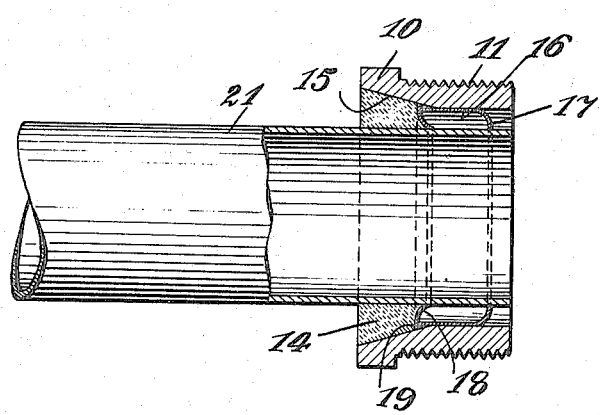
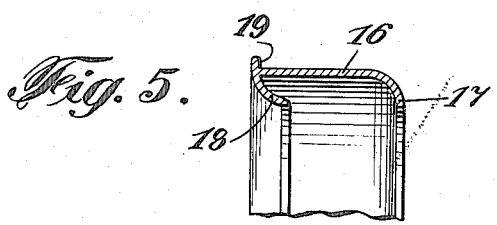
Inventor
Abram N. Pasman
By
his Attorneys Patented Nov. 18, 1924.

1,515,750

UNITED STATES PATENT OFFICE.

ABRAM N. PASMAN, OF WATERBURY, CONNECTICUT.

BUSHING LINER.

Application filed October 27, 1922. Serial No. 597,259.

*To all whom it may concern:*

Be it known that I, ABRAM N. PASMAN, a citizen of the United States, residing at Waterbury, in the county of New Haven and State of Connecticut, have invented an Improvement in Bushing Liners, of which the following is a specification.

This invention relates to a liner for bushings. Heretofore in water and other similar lines of piping wherein plumbing tube traps are employed, it has been customary to furnish a plurality of bushings with different sized openings therein to accommodate the pipe of the diameter which might be employed in any particular case. For example, in bushings for an inch and one-half pipe it has been customary to provide the same in sets with one having an opening with an inch and one-half diameter, another having an opening of an inch and three-eighths diameter, and a third, for example, with an opening of an inch and one-quarter diameter, so that a pipe of either one of these diameters might be employed.

The object of my invention is to overcome this inconvenient and expensive practice by providing a liner for a bushing of given diameter so that in the use of the bushing without a liner a pipe of a given diameter may be employed, whereas with the liner a pipe of a smaller diameter may be employed, and obviously by providing liners of different diameters pipes of as many different diameters may be employed with the bushing of a given diameter.

The liner made in accordance with my invention preferably comprises a body portion adapted to fit within the opening in the bushing and the body portion is interiorly flanged at one end to a given diameter and at the opposite end is interiorly flanged to the same diameter and also exteriorly flanged to determine the position of the liner in the bushing, the exterior flange being adapted to fit within the recessed end of the bushing, it being understood that the interiorly flanged ends of the liner are of such a diameter as to receive a pipe of a predetermined and smaller diameter than that of the bushing.

In the drawing:

Fig. 1 is a partial section and elevation of a bushing with a pipe fitted therein in the usual manner.

Fig. 2 is a section on line 2—2, Fig. 1.

Fig. 3 is a partial section and elevation of a bushing fitted with a liner of one diameter.

Fig. 4 is a similar view showing a liner of a smaller diameter, and

Fig. 5 is an enlarged section of a bushing liner made in accordance with my invention.

Referring to the drawing and particularly to Figs. 1 and 2, the ordinary bushing for pipe fittings is indicated at 10. This is cylindrical and a portion of the outer surface thereof is screw threaded at 11 to receive the cap or nut 12 forming the complementary member of the bushing as indicated at dotted lines in Fig. 1. The opening in the bushing is of a predetermined diameter and adapted to receive a pipe 13 which is secured in position therein by a filling 14 of solder or other similar material placed within the recessed outer end 15 of the bushing and the adjacent outer surface of the pipe.

The liner made in accordance with my present invention comprises a body portion 16 which is cylindrical and adapted to fit within the opening in the bushing. That is to say, the outer diameter of the body portion of the liner is substantially the same as the diameter of the opening in the bushing. At one end the body portion of the liner is interiorly flanged as indicated at 17. As illustrated, this end of the liner is similarly curved inwardly to a predetermined extent so that the opening therein is of the desired diameter. At the other end of the body portion of the liner the same is flanged both interiorly and exteriorly. The interior flange is indicated at 18 and is preferably curved toward the inwardly curved flange 17 at the opposite end of the liner, while the outward or exterior portion of the flange is indicated at 19 and is substantially at right angles to the body portion of the liner. The diameter of the flange 18 is the same as that of the flange 17; and the diameter of the exterior portion 19 of the flange at the outer end of the liner may be greater than the outer diameter of the body portion of the liner to any desired extent.

As illustrated in Fig. 3, the diameters of the flanges 17 and 18 are substantially the same as that of the pipe 21. In the use of the liner the same is placed in the bushing so that the exterior flange 19 abuts against the inclined surface of the recessed portion of the bushing, and the pipe 21 of smaller diameter than the diameter of the bushing is fitted to position, engaged by the flanges 17 and 18 and then the parts secured together by the solder filling or filling of other material in the usual manner. In Fig. 4, the liner as indicated is similar in all respects to that shown in Fig. 3 with the exception that the interior flanges 17 and 18 are larger and consequently the diameters of the same are smaller than those of the corresponding parts of the liner shown in Fig. 3. Furthermore the construction of the liner is clearly illustrated in Fig. 5. It will be apparent, however, that the liner and its flanges may be made as an integral structure, or either one or both of the flanges may be made separately and suitably connected to the body portion of the liner without departing from the nature and spirit of the invention.

It will now be apparent that with the same size or standard bushing two or more pipes having different diameters may be employed with a bushing having an opening of a predetermined diameter. For example, as shown in Fig. 1, if the pipe to be used has the same diameter as that of the bushing no liner is necessary; or if a smaller sized pipe is to be used, as indicated in Fig. 3, the liner having flanges of predetermined diameters corresponding with that of the pipe is first inserted in the bushing, the pipe placed in position and the parts connected; or as shown in Fig. 4, a liner having flanges with still smaller diameters may be employed for a pipe having a correspondingly smaller diameter. Obviously also, liners may be made for use with a bushing having an opening of predetermined diameter so that pipes of any smaller diameter may be connected to and employed with the bushing.

I claim as my invention:

1. A liner for a pipe bushing comprising a body member adapted to bear against the inner surface of the bushing and having inturned portions in spaced positions, with the edges of the inturned portions adapted to engage the surface of a pipe passing into the liner.

2. A liner for a pipe bushing comprising a body member adapted to fit within the opening in the bushing and having inturned portions at the ends thereof, the edges of the said inturned portions being adapted to engage the surface of a pipe passed into the liner, and an outturned portion at one end of the liner adapted to engage the bushing to determine the position of the liner in the bushing.

3. A liner for a pipe bushing comprising a body portion adapted to fit the opening in the bushing and having an inwardly curved flange at one end thereof, and an inwardly curved and an outwardly straight flange at the other end thereof.

4. A liner for a pipe bushing comprising a body member adapted to fit within the opening in the bushing, internal flanges at the opposite ends of the liner, the edges of the internal flanges being adapted to engage the surface of a pipe passing into the liner, and an external flange at one end of the liner adapted to engage the bushing to determine the position of the liner within the bushing.

5. A liner for a pipe bushing comprising a body portion adapted to fit within the opening in the bushing, an internal flange of predetermined diameter at one end of the liner, an internal flange of the same diameter at the opposite end of the liner, and an external flange at one end of the liner adapted to contact with the surface of an internal recess in the bushing to determine the position of the liner in the bushing.

Signed by me this 28th day of September, 1922.

ABRAM N. PASMAN.